United States Patent Office 3,347,272
Patented Oct. 17, 1967

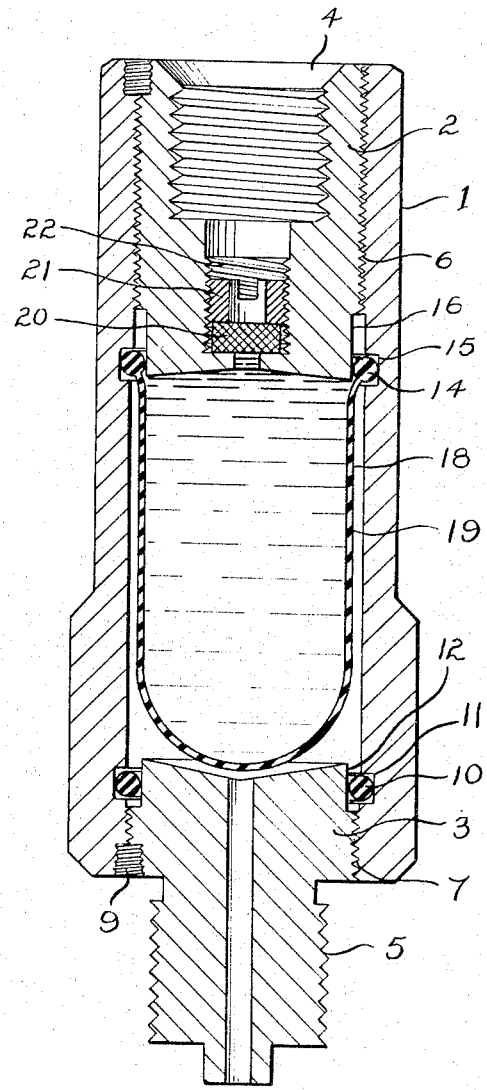

3,347,272
PROTECTOR FOR GAUGES AND THE LIKE
Wlodzimierz Rast, Flinders Park, South Australia, Australia, assignor to Rast Industries Limited, Flinders Park, South Australia, Australia
Filed Aug. 11, 1964, Ser. No. 388,805
3 Claims. (Cl. 138—30)

This invention relates to a protector for gauges and the like and in particular it relates to a device which will limit the sudden fluctuation of gauges commonly found with pressure gauges and the like where rapid pressure variations occur.

It will be known that gauges which measure hydraulic or pneumatic pressure will be damaged when suddenly subjected to large variations in pressure, and also that very rapid deterioration of the mechanism of a gauge can occur where small relatively high frequency variations occur which cause chatter in the gauge and consequently wearing out of the mechanism within a very short time.

Heretofore there has been no effective means of protecting gauges against this type of damage or wear and it is therefore the object of this invention to provide a protector which will be effective under the conditions met with and which will damp out sudden changes which could cause rapid fluctuations of the gauges.

It is a further object of this invention to so construct the means whereby these fluctuations will be avoided that there is no danger of blockage of the means which would render the gauge ineffective.

The object of the invention is achieved by providing a limiter between the supply line and the gauge which restricts the flow of fluid to the gauge and thus prevents sudden changes on the gauge itself, the purpose of the limiter being to restrict the flow to such an extent that the gauge read an average rather than being influenced by sudden fluctuations.

To ensure that the restrictor does not become blocked by sediments or particles carried by the oil or other medium when reading a pressure, the protector according to this invention is a sealed unit utilising its own pressure fluid and thereby avoiding any danger of blockage of the restrictor or of impurities entering the gauge.

An advantage resulting from the invention is that by use of the device there is no danger of a sudden outflow of a large quantity of a pressure fluid from the gauge should the gauge be broken or blown out.

According to this invention the protector comprises a member adapted to be inserted between the pressure line and the gauge which has in it a restrictor whereby the flow is limited and a bag which is adapted to isolate fluid so that the fluid which operates through the restrictor and into the valve can not mingle with the pressure fluid which actuates the gauge.

To enable the invention to be fully understood an embodiment of same will now be described with reference to the accompanying drawing designated FIG. 1 which is a central section of the gauge protector and which shows a preferred form although the invention need not necessarily be limited to this particular form, being defined in the claims appended hereunto.

A hollow body 1 has its two ends closed by means of plugs 2 and 3, the plug 2 having in it a threaded aperture 4 into which a gauge which is to be protected may be screwed, the plug 3 having on it a threaded boss 5 to which the pressure line is adapted to be attached whereby the plugs 2 and 3 act as connectors respectively for a gauge and a pressure line. The plug 2 has a tapped axially outer end in its bore and a reduced diameter axially inner end.

Both plugs are locked in position in the hollow body 1 after being screwed thereinto, the body being provided with threads 6 and 7 for this purpose, and the plugs 2 and 3 being then locked in position by means of retaining screws 8 and 9 which fit into threaded apertures formed on the joining plane between the respective plugs 2 and 3 and the hollow body 1.

The injunction between the plug 3 and the body 1 is sealed by means of an O ring 10 carried in a recess 11 in the body 1 and bearing against a cylindrical face 12 on the plug 3.

The joint between the plug 2 and the hollow 1 is similarly sealed by an O ring 14 disposed in a groove 15 in the hollow body 1 and bearing against a cylindrical surface 16 on the plug 2.

The O ring 14 forms the lip of a resilient bag 18 which depends into the hollow body 1 between the two plugs 2 and 3, and this bag 18 is adapted to contain a fluid 19 which is the fluid which operates the gauge, the inside of the bag 18 being in communication with the threaded socket 4 to which the gauge fits through a restrictor 20 which is of a porous nature so that the fluid 19 can pass through it but is sufficiently restricted in its flow so that a sudden flow cannot take place which would be capable of damaging the valve, this restrictor being held in place by a hollow threaded screw 21 engaging in a threaded aperture 22 communicating with the aperture 4 in the plug 2.

Instead of using a porous restrictor 20 a small aperture or a series of small apertures could be used or a sintered metal or the like could be selected, the purpose of this restrictor being as said to limit the rate of flow of the fluid 19 through it by means of which the gauge is operated.

The bag or membrane may be formed of polythene or any other suitable flexible material which is adapted to contain an amount of fluid sufficient when pressure is exerted on the bag to flow into the gauge to operate same, the fluid of course having to pass through the restrictor 20 on its way from the bag to the gauge.

It will be realised therefore that the pressure line fluid does not have access to the gauge but only to the inside of the hollow body 1 where it acts on the outside of the bag 18 to compress the bag 18 and thus force the fluid from the bag through the restrictor 20 into the gauge, the gauge itself being thus completely sealed off from the liquid in the pressure line and thus not subject to be blocked by impurities which could be contained in this liquid.

It will be realised of course that the bag can be varied in its form and it could be in the nature of a hollow or diaphragm provided sufficient movement is given to allow fluid isolated by the bag to actuate the gauge from pressure exerted on the bag by the liquid in the pressure line.

From the foregoing it will be seen that the objects of the invention are attained because of the presence of a restrictor 20 either in the nature of a small aperture or apertures or of a body of fibre glass or similar permeable material which provides a number of interstices or small apertures through which fluid can collectively flow but because of the number used and the resistance offered because of their small size, the flow is restricted so that a considerable pressure differential can be achieved across the restrictor, this pressure difference then allowing a time delay to be introduced in the transferring of the pressure from one side to the other so that a sudden building up of pressure will not reach the gauge in that form but will be of a more gradual nature, and similarly a sudden fall in pressure will again be transmitted as a slower change through the restrictor.

In this way it is possible to damp out sudden large fluctuations which would damage the needle and mechanism of the gauge, and similarly high frequency pressure changes which would cause rapid wear of the mechanism of the gauge can also be cut out, the invention thus achieving its object of providing a protector for the gauge which will give better reading of the gauge and at the same time will avoid damage to the gauge.

Because of the use of an isolating bag 18 between the actual pressure fluid being measured and an isolated fluid which operates the valve itself, it will be realized that the restrictor will not be subject to blockage by impurities or the like as the liquid which is isolated by the bag can be carefully selected to avoid any blockage or contamination of the restrictor.

Similarly the advantage is achieved that should the gauge itself blow out or be damaged there will not be a continued rush of the pressure fluid from the line because the bag 18 will simply be forced against the restrictor 20 or the opening to it and will then shut this off.

By unscrewing the plug 3 from the body 1 it is possible to clean the hollow within the body without losing the fluid from within the bag 18, thus making the device suitable for supporting a gauge in food processing or the like where periodic cleaning or sterilization must be effected.

What I claim is:

1. A protector for gauges comprising an elongate hollow body, a first hollow connector removably held on one end of said hollow body to connect the hollow body to a pressure line, a second hollow connector removably held on the other end of said hollow body to connect the hollow body to a gauge, a sealing member between the first connector and the body, a sealing member between the second connector and the body, a resilient bag having one end open and the other end closed fitting into and substantially filling the hollow of the said body, said bag having its open end communicating with the second hollow connector but sealed from the first hollow connector, a porous restrictor having a plurality of apertures therein positioned in the hollow of the second connector, between the second hollow connector and the open end of said bag, and a hollow threaded screw engaging in a threaded portion of the hollow of the second connector and securing said restrictor in the hollow of the second connector.

2. A protector for gauges comprising a hollow body, a first hollow connector removably secured to one end of said hollow body to connect the hollow body to a pressure line, a second hollow connector removably secured to the other end of said hollow body to connect the hollow body to a gauge, a sealing member between the first connector and the body, a resilient bag having one end open connecting to said second connector and the other end closed fitting into and substantially filling the hollow of the said body and integral with a sealing member disposed between the second connector and the body, a restrictor positioned in the hollow of the second connector, said restrictor having a plurality of small interstices which restrict the flow of a fluid therethrough, a liquid received in said bag in sufficient quantity to flow through said restrictor, through said second hollow connector to a gauge to operate the same, and hollow threaded screw means engaging a reduced diameter threaded portion of the hollow of the second connector to removably but firmly hold the restrictor in the hollow of the second connector.

3. A protector for gauges comprising an elongate hollow body, a first hollow connector removably held on one end of said hollow body to connect the hollow body to a pressure line, a second hollow connector removably engaging the other end of said hollow body and being received therein, said second hollow connector having a tapped bore section at its outer end to connect the hollow body to a gauge, a sealing member between the first connector and the body, a resilient bag having one end open and the other end closed received in and substantially filling the hollow of the said body and integral with a sealing member disposed between the second connector and the body, said second hollow connector having a reduced diameter bore section at its inner end, a restrictor positioned in the reduced diameter bore section of the second connector, said restrictor having a plurality of small interstices which restrict the flow of a fluid therethrough, said bag being of a size as to receive sufficient liquid to flow through said restrictor, the bore of said second hollow body and to a gauge connected thereto to operate such gauge, and hollow threaded screw means engaging a threaded portion of the reduced diameter bore section of the second connector to removably but firmly hold the restrictor in the hollow of the second connector.

References Cited

UNITED STATES PATENTS

| | | | |
|---|---|---|---|
| 1,832,380 | 11/1931 | Goldman | 73—392 X |
| 2,317,073 | 4/1943 | Martin | 73—395 X |
| 2,550,892 | 5/1951 | Weber et al. | 138—30 |

FOREIGN PATENTS 817,043  10/1951  Germany.

LAVERNE D. GEIGER, *Primary Examiner.*

C. L. HOUCK, *Assistant Examiner.*